(12) United States Patent
Chopra et al.

(10) Patent No.: US 6,776,831 B2
(45) Date of Patent: Aug. 17, 2004

(54) HIGH TEMPERATURE AND HIGH HUMIDITY RELEASE COATING FOR POLYMER FILM

(75) Inventors: Divya Chopra, Kingston (CA); Benjamin Andrew Smillie, Kingston (CA); Theodore John Lang, Inverary (CA)

(73) Assignee: DuPont Canada Inc., Mississauga (CA)

( * ) Notice: Subject to any disclaimer, the term of this patent is extended or adjusted under 35 U.S.C. 154(b) by 288 days.

(21) Appl. No.: 09/909,746

(22) Filed: Jul. 20, 2001

(65) Prior Publication Data

US 2002/0136843 A1 Sep. 26, 2002

Related U.S. Application Data

(60) Provisional application No. 60/219,481, filed on Jul. 20, 2000.

(51) Int. Cl.[7] ............................................. C09D 101/28
(52) U.S. Cl. ................ 106/194.1; 106/197.01
(58) Field of Search .................. 106/194.1, 197.01, 106/172.1

(56) References Cited

U.S. PATENT DOCUMENTS

| | | | |
|---|---|---|---|
| 2,273,040 A | | 2/1942 | Iler |
| 3,484,271 A | | 12/1969 | Kaliski et al. |
| 3,493,407 A | * | 2/1970 | Greminger, Jr. et al. . 106/194.1 |
| 3,503,773 A | | 3/1970 | Bisschops et al. |
| 3,755,221 A | | 8/1973 | Hitch |
| 3,837,375 A | | 9/1974 | Higgins et al. |
| 3,945,404 A | | 3/1976 | Yamamatsu et al. |
| 3,976,490 A | | 8/1976 | Macleish |
| 4,226,749 A | | 10/1980 | Veaute |
| 4,429,120 A | * | 1/1984 | Dehnke ........................ 536/91 |
| 4,444,829 A | | 4/1984 | Bollen et al. |
| 4,490,324 A | | 12/1984 | Mollison |
| 4,694,063 A | | 9/1987 | Hilaire et al. |
| 4,735,860 A | | 4/1988 | Mizobuchi et al. |
| 4,956,233 A | | 9/1990 | Chu et al. |
| 4,956,241 A | | 9/1990 | Chu et al. |
| 5,039,341 A | * | 8/1991 | Meyer ...................... 106/194.2 |
| 5,139,835 A | | 8/1992 | Kitamura et al. |
| 5,492,599 A | | 2/1996 | Olson et al. |
| 5,547,738 A | | 8/1996 | Mitchell et al. |
| 5,858,487 A | | 1/1999 | Boehler et al. |
| 5,959,031 A | | 9/1999 | Thurgood |

FOREIGN PATENT DOCUMENTS

| | | |
|---|---|---|
| AU | 621956 | 6/1990 |
| EP | 0295375 | 12/1988 |
| JP | 63075199 | 4/1988 |

* cited by examiner

*Primary Examiner*—David Brunsman

(57) ABSTRACT

The present invention relates to a release coating composition that may be applied to a film that may then be used as a substrate useful for applications requiring release for a broad range of temperatures and high humidity conditions, which temperatures may range from about 20° C. to about 210° C. These applications include release substrate used in the manufacture of calendared cured sheet rubber and molding paste composites, such as sheet molding compound (SMC), thick molding compound (TMC), bulk molding compound (BMC) and fiberglass composites. The release coating composition comprises a solution of a hydroxypropyl methylcellulose having hydroxypropyl molar substitution of from 0 to about 0.82. In a preferred form, particulate solids are present in the composition.

11 Claims, 8 Drawing Sheets

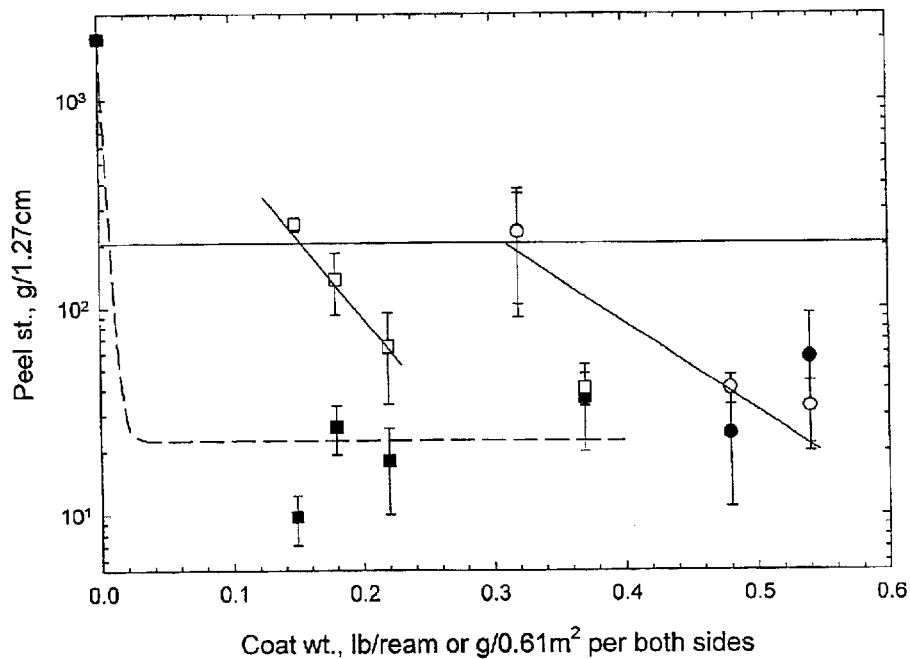
Figure 1. *Dry and wet release test results as a function of coat weight for* (•) *TM®-8836;* (□) *Methocel® K35LV coated Dartek® T404. The solid lines are to guide the eye. The dashed line is the 3 parameter exponential decay model fit for Methocel® K35LV wet release test results. The closed symbols represent wet release test results and the open symbols represent dry release test results.*

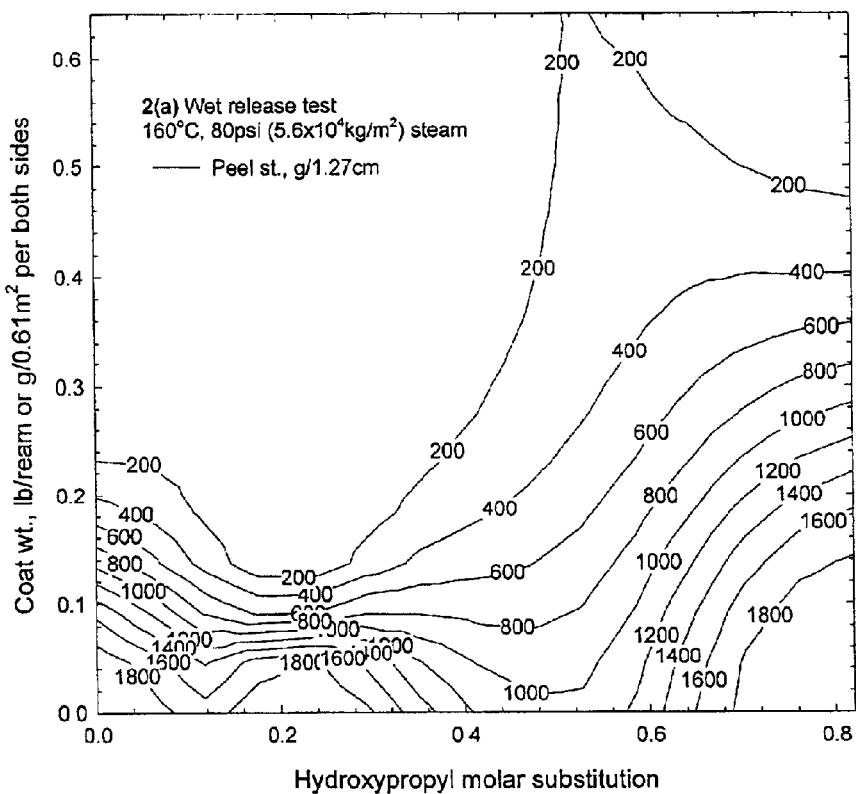
Figure 2a. *Effect of varying molar hydroxypropyl substitution in hydroxypropyl methylcellulose coated Dartek® T404 on peel strength in a wet release test with Viton®. The solid line contours represent the peel strength in g/1.27cm.*

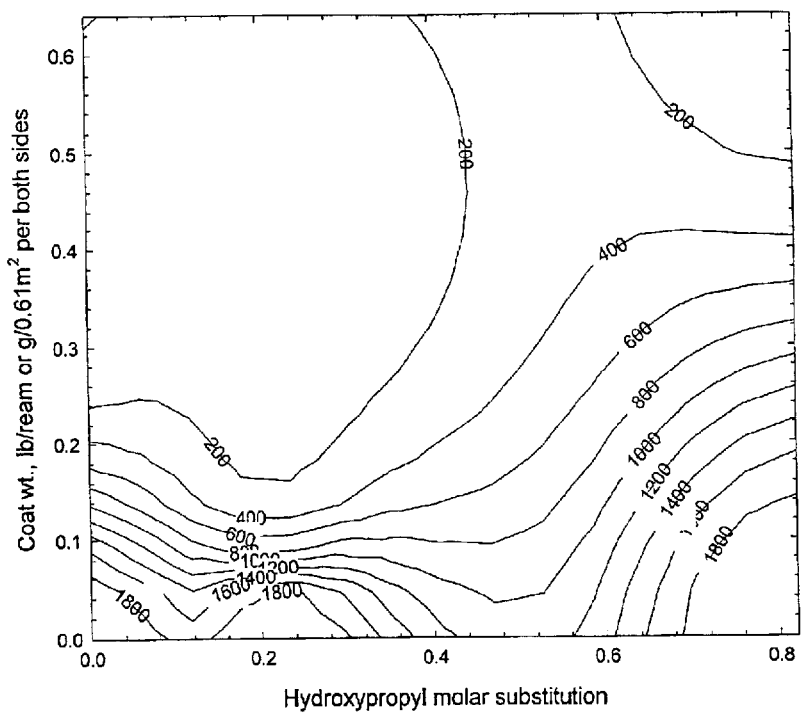
Figure 2b. *Effect of varying molar hydroxypropyl substitution in hydroxypropyl methylcellulose coated Dartek® T404 on peel strength in a dry release test with Viton®. The solid line contours represent the peel strength in g/1.27cm.*

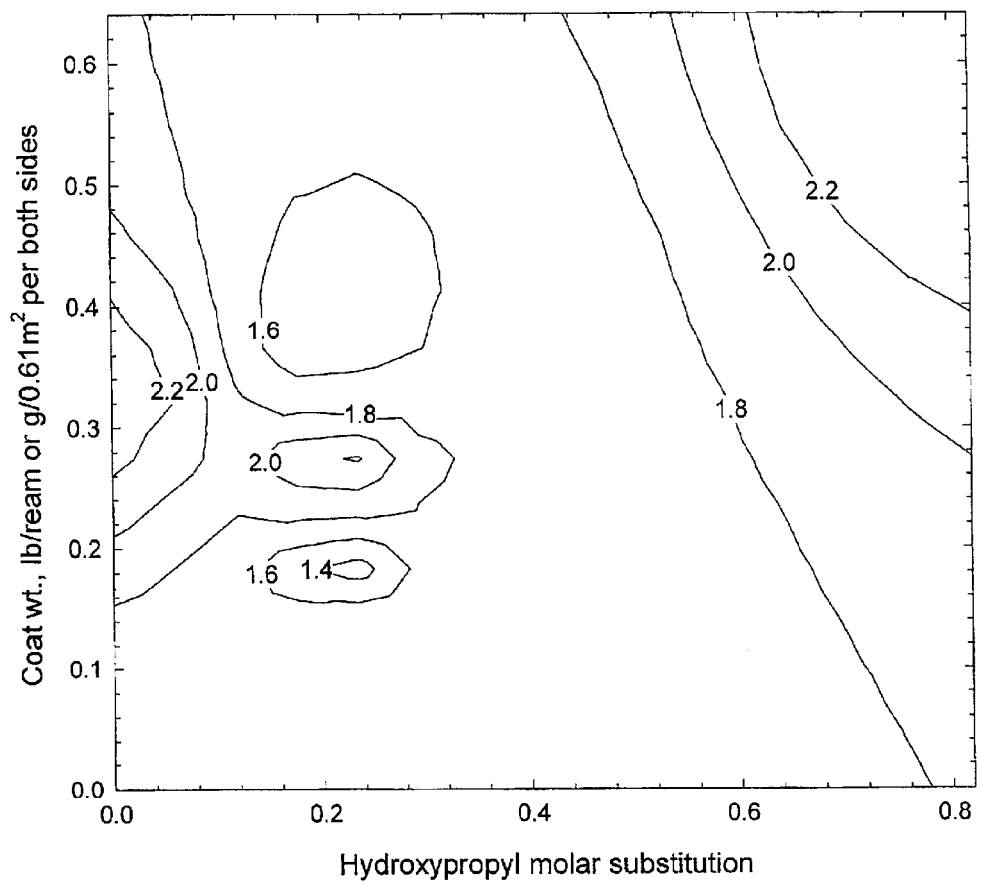
Figure 3. *Effect of varying molar hydroxypropyl substitution in hydroxypropyl methylcellulose coated Dartek® T404 on haze after a wet release test. The solid line contours represent lines of constant percent haze.*

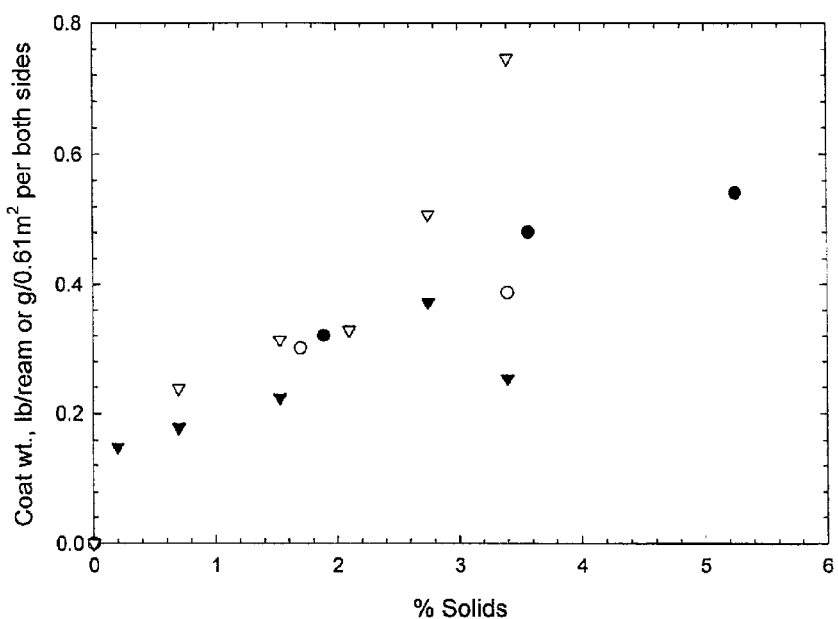
Figure 4. *The coat weight obtained on Dartek® T404 on a Faustel coater using 165 quad cylinder, as a function of percent solids in the water plus isopropanol solution containing (•) TM®-8836; ( ) Methocel® E15LV; ( ) Methocel® K35LV; (⊕) Methocel® E15LV+Ludox® CL-P.*

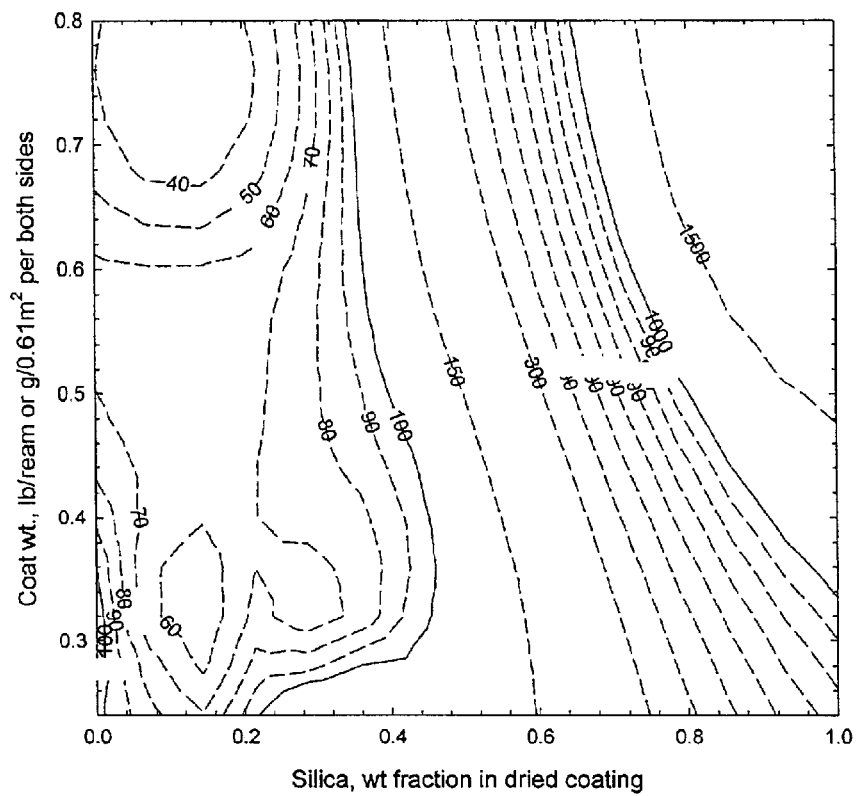
Figure 5. *Effect of adding silica to Methocel®E15LV on the surface of Dartek®T404 film in a dry release test. The solid line contours represent constant peel strength in a dry release test.*

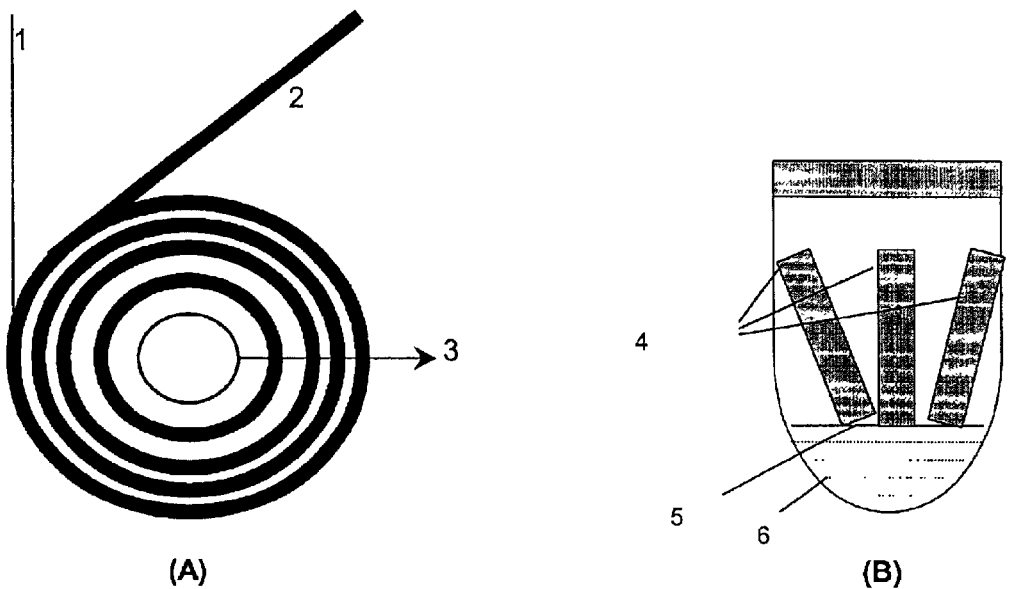

Figure 6.(A) *A Cross-sectional view of the rubber roll before being cured in a steam oven. The dark concentric circles represent sheet of Viton spaced by Dartek® release film.* (B) *Rubber curing in an autoclave. The labels 1 to 6 represent the following: 1- polymer release film, 2- Rubber sheet, 3-core, 4-Rubber rolls interleaved with the release film in the autoclave, 5-Wire mesh separating water from the rubber rolls, 6-*

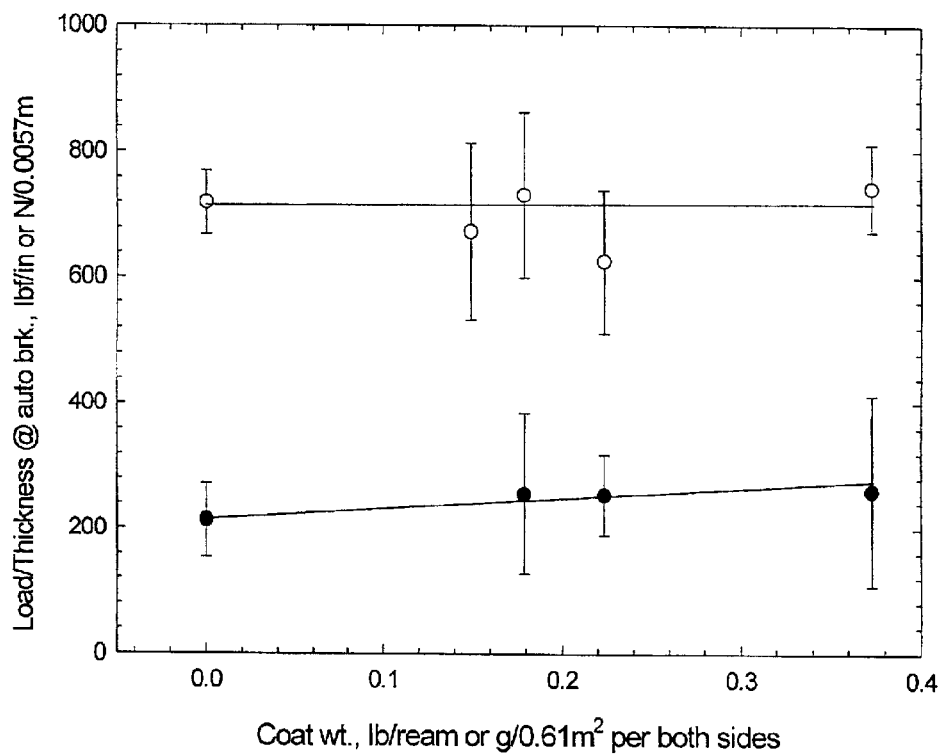
Figure 7. Grave's unnotched tear results for Methocel®K35LV coated Dartek®T404 release film. The closed symbols represent Grave's tear results in the machine direction and the open symbols represent Grave's tear results in the transverse direction. The solid lines are to guide the eye.

HIGH TEMPERATURE AND HIGH HUMIDITY RELEASE COATING FOR POLYMER FILM

RELATED INVENTION

This application claims the benefit of U.S. Provisional Patent Application No. 60/219,481 filed Jul. 20, 2000 which is incorporated herein by reference.

FIELD OF THE INVENTION

The present invention relates to a release coating composition that may be applied to a film that may then be used as a substrate useful for applications requiring release for a broad range of temperatures and high humidity conditions, which temperatures may range from about 20° C. to about 210° C. These applications include release substrate used in the manufacture of calendared cured sheet rubber and molding paste composites, such as sheet molding compound (SMC), thick molding compound (TMC), bulk molding compound (BMC) and fiberglass composites.

BACKGROUND OF THE INVENTION

In the rubber industry, sheets of cured rubber compound are prepared by a calendaring process. Typically these sheets are from about 100 to about 400 feet in length. The uncured rubber sheet is laid onto a supporting interleaf film or sheet and then the two sheets are wound onto a mandrel. The interleaf is usually cellophane or silicon coated paper. The interleaf does not melt at the curing temperature and prevents the sheets from fusing with each other during the curing process. Sometimes talc or zinc stearate is applied to the interleaf to enhance release of rubber sheets from the interleaf after curing. Subsequently, the roll of rubber and interleaf can be over wound and held under tension using an over-wrap, which can be any film or cloth having good tensile properties that tends to shrink at oven curing temperatures. The cured sheet rubber may be used as components for aircraft engines and gaskets for rubber roofing membranes. Teflon® sheets, talc dust, and cloth are commonly used as interleaves in the rubber industry.

SMC is a composite material and usually comprises crosslinkable polymeric resin, most often unsaturated polyester resin; styrene monomer, plus catalyst; particulate filler, such as calcium carbonate; chopped glass fiber reinforcement; and various other additives in minor amounts, such as pigments and other modifiers.

The manufacture of SMC begins by laying the paste comprising all ingredients except the glass fibers, on a bottom carrier or release sheet, i.e., a film. The glass fibers are poured on top of the resin. More paste is poured over the glass fibers. A top carrier release sheet is laid down, and the edges of the top and bottom sheets are folded over to form a sandwich. The film and hence the composite is then kneaded to mix the glass fibers and the paste. The sandwich is then festooned (folded back and forth in a continuous fashion) into a bin and stored for up to about 14 days to cure or mature. Satisfactory results may be obtainable after as little as 2.5 days, but often more time is required. During this time the viscosity of the composite increases significantly (approximately ten-fold).

At the end of the curing period, the carrier release films, top and bottom are stripped away, the solidified SMC is cut and put into a heated press. In roughly one minute or less, out comes a semi-finished product, such as an auto part, for example, an automobile hood.

TMC is produced by a different machine and a process different from those used for producing SMC. Although TMC is prepared as a continuous length of material, it is cut into slabs for curing and storage because it is thicker than SMC. SMC is usually 1" thick, but may range from ¼" to 3" in thickness. TMC may range from ½" to 4" in thickness. TMC is stronger because some of its fiberglass fibers may be positioned vertically, and more filler may be added. A most significant difference between SMC and TMC is that in making TMC, the glass fibers are mixed with the paste prior to being deposited on the carrier or release film, and thus no kneading of the composite sandwich is necessary when TMC is made into slabs. This therefore places different requirements on the carrier or release film as tear strength may not be as critical for carrier release film used to make TMC.

BMC is also a composite material of resins, fillers and reinforcements. Typically, it comprises 30% resins, 50% fillers and additives and 20% reinforcement, such as glass fiber. It may also contain catalysts. The high filler loadings can provide improved stiffness and fire retardence. BMC is manufactured by preparing a putty-like molding compound comprising the above-noted components in a "ready to mold" form. Molding pressures usually range from about 350 to 2000 psi at temperatures of between 250 and 350° F. BMC can be made into precise shapes with various types of inserts, and therefore the moldings can be extremely complex. One limitation of BMC is the loss of strength caused by degradation of glass fiber reinforcements during energy-intensive mixing.

BMC is primarily used as a replacement for cast metals. The actual physical characteristics of BMC are determined primarily by the choice of resin and desired end use. Possible end uses include electrical grade; low shrink/general purpose; appliance/structural; low profile; automotive grade; and corrosion resistant. Major applications of BMC include air conditioner components; pump housings; circuit breakers; computer and business equipment components; garbage disposal housings; motor parts; power tools; gear cases; electrical insulators; and circuit covers.

In selecting a carrier release film there are some basic requirements or properties that are preferably met for the film to be suitable. While styrene barrier, moisture barrier, and mechanical strength are relevant, most important are release from the paste composite, be it SMC, BMC, or TMC, and the cost of the release film.

Nylon films represent a potential replacement for silicon-coated paper and cellophane as interleaves in the rubber calendaring industry, because of their high tensile strength. However, the tendency of currently manufactured nylon films to stick to rubber compounds both cured and uncured limits their use in a rubber release application. Apart from sticking to the sheets of rubber, the latter film sometimes causes wrinkles on the surface of the cured rubber. It is speculated that gases emanated during curing of rubber cause such wrinkles.

Cellulose ethers are water-soluble polymers derived from cellulose. A commercially available cellulose ether is available under the Methocel® brand from The Dow Chemical Company. These products are available in various viscosity grades, ranging from 3 to over 200,000 mPa's. Generally, these viscosities refer to the viscosity of a 2% Methocel® solution in water at 25° C. The methylcellulose products include hydroxypropyl substituted cellulose ethers. Such products are also available from other sources such as China Yixing Kaili Chemical Pharmaceutical Factory of Yixing city, Jiangsu, China; Carbomer Inc of Westborough, Mass.; and Penta Mnfg. Co. of Livingston, N.J. Methocel® products are used as mold-release agents, stabilizers, and thickeners in rubber latexes, where they contribute also to more uniform drying and less pinholing (see Dow METHOCEL® Cellulose Ethers Technical Handbook available from The Dow Chemical Company Website, July 2000).

BACKGROUND ART

Various attempts have been made to make and coat non-stick coatings to film or film structures used for high temperature applications. Some of the prior art patents pertaining to release coatings are summarized hereafter:

U.S. Pat. No. 5,139,835 to Kitamura et al discloses a synthetic resin laminated paper which makes it possible to recover paper (or laminated film) materials easily and rationally. The adhesion-release control agent layer interposed between the polyethylene film and paper layer can be polyvinyl alcohol, silicone based compound, or a reaction product of an organopolysiloxane compound having at least one double bond which has reacted with said hydrogen atom.

U.S. Pat. No. 3,503,773 to Bisschops et al discloses a process for forming films or foils using a high-gloss-surface or the "casting layer". The film-forming polymer solution is applied to the casting layer and at the end of the process the polymer film is stripped off the casting layer. The casting layer is a mixture of cellulose acetate and Werner chromium complex salt.

U.S. Pat. No. 4,956,233 to Chu et al discloses a slip-coated thermoplastic film having good antiblocking properties. The slip coating comprises of an aqueous wax emulsion or dispersion and a minor amount of talc, syloid or amorphous silica gel.

U.S. Pat. No. 4,956,241 to Chu et al discloses a slip-coated biaxially oriented film having good antiblocking properties. The slip coating comprises of (a) an aqueous wax emulsion or dispersion, (b) an aqueous polymer solution or emulsion with $T_g$ between 30°–100° C., and (c) a minute amount of talc or syloid.

U.S. Pat. No. 3,945,404 to Yamamatsu et al discloses a food casing having the inner surface thereof coated with a water-soluble chromium complex to enhance the release of processed meat from the casing.

U.S. Pat. No. 5,547,738 to Mitchell et al discloses liner less labels where the substrate has a pressure sensitive adhesive on one face and a release coating on the other. The preferred release coatings are formulations, which include silicone resins and chrome complexes of fatty acids.

U.S. Pat. No. 5,492,599 discloses a treated cellulose-based substrate e.g. paper with good release properties. The treated substrate is coated with a primer coating comprising a cationic polymer and with a release coating comprising a carboxy- or carboxylate-containing release polymer.

U.S. Pat. No. 2,273,040 describes Quilon®, Werner-type chrome complexes useful for making a variety of substrates hydrophobic, oleophilic, and softer.

U.S. Pat. No. 3,484,271 to Kaliski et al describes a two-step process where a polyfunctional anionic component is applied followed by treatment with a polyfunctional cationic component (Quilon® Chrome Complex) to yield a surface adhesive to cooked food and plastic masses.

Japanese Examined Patent Application 63,075,199 (Kanzaki Paper) describes a water-soluble copolymer release agent for paper, with Tg of 60–20° C., consisting of (a) 5 to 50% of a hydrophilic ethylenically unsaturated monomer, e.g., (meth)acrylic acid or maleic acid, (b) 20 to 95% of a (meth)acrylate monomer having 4–10 carbons, e.g. butyl or hexyl, and (c) 0 to 40% of another copolymerizable monomer, e.g. vinyl acetate, styrene or acrylonitrile. The release paper has excellent threading and release properties.

U.S. Pat. No. 4,226,749 describes a sizing composition with a cationic and anionic component mixture in a clay coating formulation.

U.S. Pat. No. 3,976,490 describes topical coating comprising a particulate material e.g. silica, $CaCO_3$ in a polymeric binder adhered to the opaque plastomeric sheet material. The size of the particles and the thickness of the binder are selected to provide for the protuberance of at least a portion of the particles to act as spacers and thus function as the primary antiblocking component.

U.S. Pat. No. 5,959,031 issued to Thurgood Sep. 28, 1999 describes a polyamide film forming resin and at least one release agent material selected from the group consisting of N, N' ethylene bis amides of the formula $R_1$—CO—NH—$CH_2$—$CH_2$—NH—CO—$R_2$ wherein $R_1$ is an aliphatic hydrocarbon chain of about 14 to about 42 carbon atoms, and $R_2$ is a hydrogen atom or an aliphatic hydrocarbon chain of about 14 to about 42 carbon atoms, wherein the release agent material is present in an amount such that after the paste composite is formed, substantially all of the film can be removed from the surface of the composite.

U.S. Pat. No. 3,837,375 to Higgins et al describes a container used for packaging viscous tacky polymers by the process of hot filling. The latter containers have an inner lining of heat stabilized nylon coated with a silicone release agent; an uncoated cellophane film; a mineral pigment coated kraft paper overcoated with a silicone release agent; or kraft paper coated with finely divided mica. These containers are able to withstand hot packaging temperatures up to 450° F. and at the same time permit the contents to be readily removed.

European Patent EP 0295375A2 discloses a silicone coated release film used in film impregnation of cyanate resin based prepegs in a continuous process. The release film is stripped from the advancing impregnated film while simultaneously one or more new release films are applied to the prepeg before, during or after impregnation. Apparently, the silicone coated release papers showed better release than those coated with QUILON® in the temperature range of 125° C.-300° C.

U.S. Pat. No. 5,858,487 to Boehler et al discloses a six layer microwaveable food wrap where the top layer is a non-stick coating for use in preventing food from adhering to a polymeric layer. The non-stick coating is made from a chrome complex of stearic acid ((chromium, pentahydroxy, (tetradecanoata)di-)), and is commercially available from E.I. du Pont de Nemours and Company as QUILON® C complex (both methyl cellulose and hydroxypropyl methylcellulose are recognized as acceptable food additives by the US Drug Administration (FDA) and are listed in the food chemicals codex alimentarius (Dow's product literature)).

U.S. Pat. No. 4,735,860 discloses a heat transfer sheet, which prevents sticking and blocking problems and makes it possible to carry out printing smoothly. The latter sheet has hot-melt ink layer or one side and heat-resistant protective layer on the other. The heat-resistant protective layer comprises (a) thermoplastic resin having a COOH or OH group, (b) a polyamine or polyisocyanate, and a (c) a thermoplastic resin, or a composition based on a silicone-modified resin.

The various types of release materials can be categorized as waxes, such as petroleum waxes, vegetable waxes, animal waxes, and synthetic waxes; fatty acid metal soaps, such as metal stearates and others, for example, calcium ricinoleate; other long chain alkyl derivatives, fatty esters, fatty amides and amines, fatty acids and alcohols; polymers, such as polyolefins, silicones, fluoropolymers, natural polymers; others like poly(vinyl alcohol) and polyoxyalkylenes; fluorinated compounds and fluorinated fatty acids; and inorganic materials, such as silicates, talc, clays, kaolin, mica, and other particulates such as silica, graphite and carbon.

While all of the above references propose release coatings of various types, there remains a need for effective, inexpensive, high temperature, high humidity release coatings which can be applied to thermally resistant polymer films and which do not permanently transfer off the film to the surface in contact therewith.

Traditional release agents such as erucamide and polytetrafluoroethylene, which bloom to the surface in polyolefins, fail to do so in case of nylon films, such as polyamide66. Apparently, polyamide66 films have higher surface tension (43–50dyn/cm), can absorb up to 2% by weight of water and can be heated up to 150° C. with no degradation. All these properties make polyamide66 film a friendly substrate for coating with water based coatings.

The disclosures of all documents, patents and applications referred to herein are incorporated herein by reference.

SUMMARY OF THE INVENTION

The present invention provides in a first aspect a coating composition for use as a surface coating for polymer release films for use in high temperature and/or high humidity applications, which comprises a solution of at least one hydroxypropyl methylcellulose having hydroxypropyl molar substitution of from 0 to about 0.82.

In another aspect, the invention provides a release coating composition as defined above, wherein the solution comprises from about 0.2% to about 40% by weight, preferably from about 0.2% by weight to about 15% by weight of low viscosity hydroxypropyl methylcellulose having hydroxypropyl molar substitution of from 0 to about 0.82 in water, wherein low viscosity means the viscosity of a 2% by weight of a solution of hydroxypropyl methylcellulose in water is up to 100 centipoise at room temperature (20° C.). The hydroxypropyl methylcellulose is infinitely soluble in water and the maximum amount is determined by the coating equipment and cost limitations.

In another aspect, the invention provides a release coating composition as defined above, wherein the solution comprises up to about 3% by weight of high viscosity hydroxypropyl methylcellulose having hydroxypropyl molar substitution of from 0 to about 0.82 in water, wherein high viscosity means the viscosity of a 2% by weight of a solution of hydroxypropyl methylcellulose in water is from 100 to 100,000 centipoise at room temperature (20° C.).

In another aspect, the invention provides a process for coating the surface of a polymer film to provide a release film for use in high temperature and/or high humidity conditions, which comprises coating at least one surface of the polymer film with a solution of a hydroxy propyl methyl cellulose having hydroxypropyl molar substitution of from 0 to about 0.82 to provide a coating weight of at least about 0.004 lb/ream per side and drying the coated film to set the coating. In another embodiment of this process, the film is coated on both sides in separate passes or in a single pass to achieve the desired coating weight.

In yet another aspect, the invention provides a release polymer film coated on at least one surface with hydroxypropyl methyl cellulose having hydroxypropyl molar substitution of from 0 to about 0.82. The release film may also be coated with a mixture of the hydroxypropyl methylcellulose having hydroxypropyl molar substitution of from 0 to about 0.82 and particulate solids.

The release coating of the present invention has been found to be useful in cured rubber manufacturing applications and also has utility in the manufacture of SMC, BMC and TMC, as well as fiberglass composites. In addition, it is useful in applications such as those described in U.S. Pat. No. 3,837,375 (packaging of hot, highly viscous, tacky polymers such as low molecular weight polystyrene); U S. Pat. No. 5,858,487 (laminated, non-stick food wraps); and U.S. Pat. No. 4,735,860 (therma-sensitive transfer sheets); as well as EP 0 295 375 (cyanate resin-based prepregs and films for use in advanced structural materials).

In another aspect the invention provides a process for curing rubber which comprises forming a sheet rubber layer in a calendar, laying layers of a release film as described above between layers of the sheet rubber, tightly overwrapping the stack of layers with a release film or cloth, before subjecting the stack of layers to elevated temperature in a dry or steam oven wherein the sheet rubber or sheet molding compound is cured and subsequently unwrapping the stacked, cured sheets.

In another aspect the invention provides a process for producing sheet molding composites which comprises:

(a) casting a layer of heat-curable thermosetting resin, in fluid form, onto a continuously advancing polymeric release film;

(b) introducing reinforcing material onto the advancing fluid layer;

(c) laying a polymeric film on the top surface of said reinforced fluid layer thereby forming a sandwich composite;

(d) advancing said sandwich composite through a series of kneading and compaction rolls; and (e) winding the sandwiched composite into a roll for partial curing;

the improvement comprising using a release film as defined above. In a variant of this process a particulate solid is also present in the release coating composition.

In another aspect the invention provides a process for making thick molding composites, comprising (a) introducing reinforcing material into a heat-curable thermosetting resin, in fluid form and mixing same until the material is mixed and wetted;

(b) casting a layer of said mixture onto a continuously advancing polymeric film;

(c) laying a polymeric film on the top surface of said reinforcing material-resin layer to form a sandwich composite;

(d) advancing the sandwich composite through at least one compaction roll;

(e) cutting the continuous lengths of the sandwich composite into lengths for partial curing;

the improvement comprising using a release film as defined above. Again, the release composition may also include a particulate solid.

DETAILED DESCRIPTION OF THE INVENTION

In the following Table 1 there is set out the hydroxypropyl molar substitution of various grades of hydroxypropyl methylcellulose available commercially from the Dow Chemical Company, which have been found to be useful in the present invention.

TABLE 1

DIFFERENT GRADES OF HYDROXYPROPYL METHYL CELLULOSE

| Product | Hydroxypropyl molar substitution |
|---|---|
| Methocel ®A | 0 |
| Methocel ® E | 0.23 |
| Methocel ® F | 0.13 |
| Methocel ® J | 0.82 |
| Methocel ® K | 0.21 |

The degree of hydroxypropyl substitution affects the viscosity of the methyl cellulose. Hydroxypropyl methyl cellulose grades can be classified into high viscosity and low viscosity grades. Low viscosity grades of hydroxypropyl methyl cellulose are those grades, which at solution concentration of about 2% in water at room temperature (20° C.) result in the solution viscosity in the range of 0.1–100 centipoise. High viscosity grades of hydroxypropyl methyl cellulose are those grades, which at solution concentration of about 2% in water at room temperature (20° C.) result in the solution viscosity in the range of 100–100,000 centipoise. The useful amounts for coating solutions of hydroxypropyl methylcellulose for use in the present invention range from about 0.2% to about 40% by weight, preferably from about 0.2% up to about 15% by weight. A most preferred range is from about 0.2 to about 6.0% by weight hydroxypropyl methylcellulose in water. The solutions of surface treated grades of hydroxypropyl methylcellulose available from Dow Chemical Company in water require pH adjustment in order to trigger the hydration process and subsequently, the viscosity build up. The latter trigger can be conveniently achieved by adding a small amount of base, such as ammonium hydroxide to the dispersion of surface treated hydroxypropyl methylcellulose in water.

The coating of the methylcellulose solution can be performed by rolling, dipping or spraying. The rolling method is preferred. Details of these coating methods are well known to those skilled in the art. Drying of the coated film is preferably by air drying, in a heated oven, at a temperature in the range of about 40° C. to about 120° C.

The humidity conditions under which the release film performs range from 0 to about 100% relative humidity. The high temperature conditions range from about room temperature (20° C.) to about 210° C.

The solution of methylcellulose may comprise a binary mixture of an organic solvent and water. Generally such a mixture preferably comprises about 2 to about 8 parts solvent per one part methylcellulose. An example of a preferred binary solution comprises from 0 to 35% by weight of alcohol, from about 0.2% to about 40% by weight of hydroxypropyl methylcellulose, and the remainder up to 100% by weight of water. There are a variety of organic solvents that may be used in such a binary mixture and the organic solvent may be selected from glycols, esters and amines. The Dow Technical Handbook for Methocel Cellulose Ethers referenced earlier contains a listing of suitable specific solvents. The solution may be prepared in concentrated form and then diluted to an appropriate concentration for the desired coating weight.

The methylcellulose solution may also contain particulate solids such as those mentioned above. Preferred are silica and talc. The ratio of particulate solid to methylcellulose is preferably in the range of from about 0.01 to about 1.5. The amount of organic solvent may range in this case up to about 50% by weight. The silica may be commercially available colloidal silica, examples of which are sold under the trade-marks Ludox®, Bindzil® and Nyacol®.

While the particulate solids act as processing aids, it has also been recognized that they facilitate higher transfer of the coating solution to the film. As a result when the particulate solid is present in the dried coating and in the preferred amount of from about 0.01 to about 0.60 by weight fraction, the amount of release agent required, namely the methylcellulose is reduced.

As is apparent from the subsequent Examples 12 to 16, a solution containing hydroxypropyl methyl cellulose and silica, for example, Methocel® E15LV/Ludox® CL-P ratio equal to 3/1, where Methocel® E15LV accounts for 1.86% to 3% of the solution, gives surprisingly higher transfer of the coating to a polymer film, such as Dartek® T404 above 2% total solid content of the solution. The latter effect viz. higher transfer of coating to the polymer film at 2% and the above total solids content in the solution can be seen in FIG. 4. Ludox® CL-P is an aqueous colloidal dispersion of 40% by weight of very small silica particles having 22 nm average particle diameter. The silica used in Ludox® CL-P is made up of negative silica particles with a positive layer of alumina. It is speculated that the positive charge imparted to the coatings of the invention by the Ludox® CL-P helps the transfer of the release coating onto the Dartek® T404 film, which has amide negative ions on the surface. For a particular coat weight of a two side coated Dartek® T404 film, 0.01–0.60 weight fraction of silica in the dried coating reduces the peel strength. The minimum in peel strength is found around 0.15 silica weight fraction. However, an excess amount of silica (above 0.60 weight fraction) on the surface increases the peel strength with complete adhesion (peel strength of 2000 g/1.27 cm from Viton® rubber compound) at 100% silica in the dried coating. The latter trend can be seen in FIG. 5.

The polymer film may be selected from polyolefins, polyesters, nylons and blends thereof. Nylon 66, Nylon 6 and polyester films are preferred. The films may be monoaxially or biaxially oriented. Generally any film having a softening point above the temperature of the application for the coating may be used. A preferred film is monoaxially oriented (in the machine direction) nylon, in particular nylon 66. A commercial example is Dartek T404 available from Enhance Packaging Technologies Inc. This film has good MD shrink properties at rubber curing conditions.

BRIEF DESCRIPTION OF THE DRAWINGS

In the accompanying drawings which are used to illustrate the present invention, FIG. 1 is a plot of Peel Strength v. Coat Weight comparing a conventional release coating with the coating of the present invention;

FIG. 2a is a graphical representation of the effect of varying molar hydroxypropyl substitution in hydroxypropyl methylcellulose coated Dartek® T404 (coating of the invention) on peel strength in a wet release test with Viton® rubber compound. The solid line contours represent the peel strength in g/1.27 cm;

FIG. 2b is a graphical representation of the effect of varying molar hydroxypropyl substitution in hydroxypropyl methylcellulose coated Dartek® T404 (coating of the invention) on peel strength in a dry release test with Viton® rubber compound. The solid line contours represent the peel strength in g/1.27 cm;

FIG. 3 is a graphical representation of the effect of varying molar hydroxypropyl substitution in hydroxypropyl methylcellulose coated Dartek® T404 (both sides) (coating of the invention) on haze after a wet release test. The solid line contours represent lines of constant percent haze;

FIG. 4 is a graphical representation of the coat weight using a variety of coatings, including those of the invention obtained on Dartek® T404 on a Faustel coater using 165 quad cylinder, as a function of percent solids in the water plus isopropanol solution;

FIG. 5 is a graphical representation of the effect of increasing the weight fraction of silica in a dried coating, on a two side coated Dartek® T404 film, on the release performance in a dry release test. The latter dried coating is a blend of Methocel® E15LV and silica. The solid line contours represent constant peel strength in g/1.27 cm in a dry release test;

FIG. 6A is a cross-sectional view of a rubber roll before being cured in a steam oven;

FIG. 6B is a schematic of the rubber rolls prepared in FIG. 6A being cured in an autoclave; and FIG. 7 is a graphical representation of the force required to initiate unnotched tear per unit thickness on samples of Dartek® T404 coated on both sides with a coating of the invention comprising Methocel® K35LV as a function of coat weight.

EXAMPLES

In the following examples a 0.001" thick, monoaxially oriented, annealed at 150° C., polyamide66 film supplied by Enhance Packaging Technologies Inc. of Whitby, Ontario under the trade name Dartek® T404 was coated using a direct gravure coater supplied by Faustel Inc. of Germantown, Wis. DuPont Dow Elastomers Inc. of Akron, Ohio supplied the uncured rubber compound used for dry and wet release testing, under the commercial name of Viton®. The latter rubber compound contained 100 parts of Viton® fluoroelastomer A201C, 3 parts of MgO, 6 parts of $Ca(OH)_2$ and 30 parts of carbon black.

In Examples 1 through 22, the coat weight of coated Dartek® T404 release films was determined by washing off the coating with water from the 8"×8" square sample. The weight loss in grams was multiplied by a factor of 14.9 to obtain the coat weight in lb/ream or in $g/0.61\ m^2$. The latter technique was recommended by Morton International, Inc. Packaging Adhesives North America of Woodstock, Ill. in document #W-3020-641-02 dated May 15, 1994.

Comparative Examples

Comparative examples 1 through 3 are aimed at evaluating the release performance of Dartek® T404 coated with a conventional high temperature, high humidity release coating. Release Coatings Inc. of New York supplied the high temperature, high humidity release coating under the trade name of TM®-8836. This coating is conventionally used as a topical release coating on polyamide films and woven fabrics in the rubber release industry, where the release film is subjected to high temperature and high humidity conditions during the curing step. TM®-8836 contains 1–4% polytetrafluoroethylene (PTFE), 2–4% dipropylene glycol methyl ether, less than 0.5% acetic acid and 4–6% NJ trade secret (NJTS Registry #00850201001-5360P) in 50–70% water. In total TM®-8836 contains approximately 21% solids.

In order to illustrate the effect of varying coating composition on the release performance of the coated films, TM®-8836 was diluted with water to three different dilution levels. The three different coating compositions along with their preparation method is outlined below:

Comparative Example 1

2.5 kg of TM®-8836 was added to 7.5 kg water to obtain 25% TM®-8836 concentrated solution in water. The solution was gently stirred for 30–40 minutes.

Comparative Example 2

3.5 kg water was added to 7.5 kg of the solution of Comparative Example 1, to obtain 17% TM®8836 concentrated solution in water. The solution was gently stirred for 30–40 minutes.

Comparative Example 3

7.11 kg water was added to 8 kg of the solution of Comparative Example 2, to obtain 9% TM®8836 concentrated solution in water. The solution was gently stirred for 30–40 minutes.

Each of the solutions prepared in comparative examples 1 through 3 were coated onto Dartek® T404 using a 165 quad cylinder on the direct gravure coater from Faustel Inc. The conditions for each run are summarized in Table 2. Each coating was laid on both sides of the film in 2 separate passes and the coat weight was measured at the end of the second pass. The coat weights mentioned in Table 2 correspond to 2 side coated Dartek® T404. The coated films prepared in run no. 2, 4, 6 in Table 2 were subjected to dry and wet release testing, the details of which are mentioned below.

TABLE 2

COATING RUNS ON 25µ THICK DARTEKT ®404 ON FAUSTEL ® FOR COMPARATIVE EXAMPLES 1, 2 AND 3.

| Process Run no. | Substrate | Ex. (Coating Used) No. | Total solids % | Line speed Fpm | Oven temp ° C. | Coat weight lb/ream/2 sides |
|---|---|---|---|---|---|---|
| 1 | 25µ Dartek ®T404 first side | 1 | 5.25 | 100 | 95 | — |
| 2 | 25µ Dartek ®T404 second side | 1 | 5.25 | 100 | 95 | 0.54 |
| 3 | 25µ Dartek ®T404 first side | 2 | 3.57 | 150 | 100 | — |

TABLE 2-continued

COATING RUNS ON 25μ THICK DARTEKT ®404 ON FAUSTEL ® FOR COMPARATIVE EXAMPLES 1, 2 AND 3.

| Process Run no. | Substrate | Ex. (Coating Used) No. | Total solids % | Line speed Fpm | Oven temp ° C. | Coat weight lb/ream/2 sides |
|---|---|---|---|---|---|---|
| 4 | 25μ Dartek ®T404 second side | 2 | 3.57 | 150 | 100 | 0.48 |
| 5 | 25μ Dartek ®T404 first side | 3 | 1.89 | 150 | 100 | — |
| 6 | 25μ Dartek ®T404 second side | 3 | 1.89 | 150 | 100 | 0.32 |

Release Testing Protocol

Two types of curing equipment are commonly used for curing rubber in the rubber release industry, viz. steam and gas ovens.

In a dry release test, approximately 2.5 g of rubber are pressed in between two release sheets at 5000 pounds (2.27 tons) in a 9 inch×9 inch (22.86 cm×22.86 cm) press and 320° F. (160° C.) for 1 hr. The time required here is rubber dependent. For example, at least 35 minutes is required for Viton® rubber. Subsequently, the sample is cooled to room temperature and a strip (4"×½") of the release sheet/rubber/release sheet sandwich is cut and subjected to a 90 degree peel test at a crosshead speed of 10"/min using a peel tester. The peel test is conducted as per the Pressure Sensitive Tape Council's appendix B and ASTMD1876. The above mentioned curing conditions for the latter release test were obtained after investigating the effect of temperature, pressure and cure time on the peel strength by means of experimental design. The dry release test is designed on the assumption that humidity has no effect on peel strength.

A wet release test is designed such that the high humidity curing condition is taken into account. As per this test, a 4"×12" sheet of uncured Viton® rubber compound interleaved with the release film is rolled onto a stainless steel core, 6" long having an outer diameter of ¾". A cross-sectional view of the rubber interleaved with the release film mounted on the core is shown in FIG. 6(A). The latter roll is over-wrapped with a masking tape. This roll is fed into an autoclave for curing at 160° C., 80 psi steam. The 1 L autoclave already contains 100 ml water, which is separated from the rubber rolls using a wire mesh. This water turns to 80 psi steam at 160° C. A schematic of the autoclave is shown in FIG. 6(B). The rubber roll is kept in the autoclave under latter conditions for 35 minutes before cooling down the autoclave and taking out the cured rubber rolls. Subsequently, the rubber rolls are unwrapped and the force required to peel off the release film from the cured rubber is determined as per the Pressure Sensitive Tape Council's appendage B and ASTMD1876.

Release Test Results

Dry and wet release tests were conducted on TM®-8836 coated Dartek® T404 release films prepared in run no. 2, 4, 6 mentioned in Table 2 with uncured Viton® rubber compound. The results are mentioned in Table 3 and plotted as a function of coat weight in FIG. 1. It can be seen in FIG. 1 that the results of the dry release test are very close to the results of the wet release test. This suggests that TM®-8836 coating is relatively unaffected by moisture. Also, a minimum coat weight of 0.32 lb/ream of TM®-8836 is required per two sides of Dartek® T404 to achieve acceptable peel strength in dry and wet release tests.

TABLE 3

DRY AND WET RELEASE TEST RESULTS OF RELEASE FILMS PREPARED IN COMPARATIVE EXAMPLES 1 TO 3 WITH VITON ® RUBBER.

| | Dry release test result | | Wet release test result | |
|---|---|---|---|---|
| Ex. No. | Av. Peel st., g/1.27 cm | σ | Av. Peel st., g/1.27 cm | σ |
| 1 | 32.9 | 11 | 57 | 37 |
| 2 | 40.4 | 6.7 | 24.4 | 13.52 |
| 3 | 231.1 | 126.7 | 234.4 | 145 |

The following examples are aimed at evaluating the dry and wet release strength of hydroxypropyl methylcellulose supplied by Dow Chemical Company under the trade name Methocel® coated on Dartek® T404. These examples illustrate the effect of different coat weights and different grades of Methocel® on the release of Vitono rubber compound from the surface of the coated film after rubber curing.

Eight different coating compositions (Examples 4 to 11) were prepared to illustrate the effect of substitution and hydroxypropyl methylcellulose concentration in solution on coating performance. The preparation of each coating is described below and summarized in Table 4. A description of the five different levels of substitution for the Methocel® products, of hydroxypropyl in hydroxypropyl methylcellulose is mentioned in Table 1.

TABLE 4

COMPOSITION OF VARIOUS COATINGS PREPARED FOR COATING DARTEK ®T404 FILM FOR EXAMPLES 4 TO 11. THE DASH LINE MEANS 0%.

| | Weight % | | | | | |
|---|---|---|---|---|---|---|
| Ex. No. | Methocel ® K35LV | Methocel ® E15LV | Methocel ® A15LV | Methocel ® J5MS | Isopropanol | Water |
| 4 | 3.4 | — | — | — | 22.1 | 74.5 |
| 5 | 2.67 | — | — | — | 17.35 | 79.98 |

TABLE 4-continued

COMPOSITION OF VARIOUS COATINGS PREPARED
FOR COATING DARTEK ®T404 FILM FOR
EXAMPLES 4 TO 11. THE DASH LINE MEANS 0%.

| | Weight % | | | | | |
|---|---|---|---|---|---|---|
| Ex. No. | Methocel ® K35LV | Methocel ® E15LV | Methocel ® A15LV | Methocel ® J5MS | Isopropanol | Water |
| 6 | 1.53 | — | — | — | 9.94 | 88.53 |
| 7 | 0.7 | — | — | — | 4.55 | 94.75 |
| 8 | 0.2 | — | — | — | 1.3 | 98.5 |
| 9 | — | 3.4 | — | — | 22.1 | 74.5 |
| 10 | — | — | 2 | — | 13 | 85 |
| 11 | — | — | — | 0.97 | 6.3 | 92.73 |

Example 4

0.272 kg Methocel® K35LV was added to 1.768 kg isopropanol while continuously stirring the solution to form a slurry. 5.96 kg cold tap water was added to the latter slurry to make 8 kg of solution. The solution was continuously agitated for 30–40 minutes to form a clear viscous solution.

Example 5

1.61 kg cold tap water was added to 5.875 kg of the solution of Example 4 while gently stirring the solution. Stirring was continued for 20–30 minutes.

Example 6

3.99 kg cold tap water was added to 5.355 kg of the solution of Example 5 while gently stirring the solution. Stirring was continued 20–30 minutes.

Example 7

8.97 kg cold tap water was added to 7.565 kg of the solution of Example 6 while gently stirring the solution. Stirring was continued for 20–30 minutes.

Example 8

6.25 kg cold tap water was added to 2.5 kg of the solution of Example 7 while gently stirring the solution. Stirring was continued for 20–30 minutes.

Example 9

0.272 kg Methocel® E15LV was added to 1.768 kg isopropanol while continuously stirring the solution to form a slurry. 5.96 kg cold tap water was added to the latter slurry to make 8 kg of solution. The solution was continuously agitated for about an hour to form a clear viscous solution.

Example 10

0.16 kg Methoce® A15LV was added to 1.04 kg isopropanol to form slurry. To this was added 6.8 kg cold tap water while gently stirring the solution. Stirring was continued for about an hour until a clear solution was obtained.

Example 11

0.16 kg Methocel® J5MS was added to 1.04 kg isopropanol while continuously stirring the solution to form slurry, having pH less than 7.5. To this was added 15.3 kg cold tap water with trace amounts of NH$_4$OH to adjust the pH above 8.5. The solution was continuously agitated for 30–40 minutes to form a clear viscous solution.

Coating Runs

The above mentioned coatings of Examples 4 to 10 were coated onto Dartek® T404 using 165 quad cylinder on the direct gravure coater from Faustel Inc. The coating prepared in Example 11 was coated onto Dartek® T404 using a number 90 tri-helical cylinder. The values of coating parameters viz. line speed and temperature of the oven is set out in Table 5. The first side is coated in the first run and then the uncoated side is coated in the second run e.g. 25μ thick Dartek® T404 is coated with the coating produced in Example no. 4, in run no. 7 and then subsequently, the uncoated side of the film is coated in run no. 8.

TABLE 5

Coatings applied to Dartek T404 film on Faustel.

| Run. No. | Substrate | Ex. No. | Total solids % | Line speed fpm | Oven temp ° C. | Coat weight lb/ream/ 2 sides |
|---|---|---|---|---|---|---|
| 7 | 25μ Dartek ®T404 first side | 4 | 3.4 | 150 | 104 | — |
| 8 | 25μ Dartek ®T404 second side | 4 | 3.4 | 150 | 104 | 0.2533 |
| 9 | 25μ Dartek ®T404 first side | 5 | 2.67 | 150 | 104 | — |
| 10 | 25μ Dartek ®T404 second side | 5 | 2.67 | 150 | 104 | 0.3725 |
| 11 | 25μ Dartek ®T404 first side | 6 | 1.53 | 150 | 100 | — |
| 12 | 25μ Dartek ®T404 second side | 6 | 1.53 | 150 | 100 | 0.2235 |
| 13 | 25μ Dartek ®T404 first side | 7 | 0.7 | 150 | 100 | — |
| 14 | 25μ Dartek ®T404 second side | 7 | 0.7 | 150 | 100 | 0.1788 |
| 15 | 25μ Dartek ®T404 first side | 8 | 0.2 | 150 | 102 | — |
| 16 | 25μ Dartek ®T404 second side | 8 | 0.2 | 150 | 102 | 0.149 |
| 17 | 25μ Dartek ®T404 first side | 9 | 3.4 | 150 | 102 | — |
| 18 | 25μ Dartek ®T404 second side | 9 | 3.4 | 150 | 102 | 0.3874 |
| 19 | 25μ Dartek ®T404 first side | 10 | 2 | 150 | 105 | — |
| 20 | 25μ Dartek ®T404 second side | 10 | 2 | 150 | 105 | 0.3278 |
| 21 | 25μ Dartek ®T404 first side | 11 | 0.97 | 100 | 110 | — |
| 22 | 25μ Dartek ®T404 second side | 11 | 0.97 | 100 | 110 | 0.64 |

Release Test Results

The two-side hydroxypropyl methylcellulose coated Dartek® T404 release films prepared in run nos. 8, 10, 12, 14, 16, 18, 20, 22 in Table 5 were subjected to wet and dry release tests with uncured Viton® rubber compound. The peel strengths obtained in both dry and wet release tests along with their standard deviations for the Dartek® T404 films coated on both sides with the coatings listed in Table 4 are mentioned in Table 6 and Table 7, respectively which appear hereafter. The results in Table 6 and 7 clearly show that higher coat weights of hydroxypropyl methylcellulose are required for acceptable release (less than 200 g/1.27 cm) in a dry release test than in a wet release test. Uncoated Dartek® T404, sticks to Viton® in both wet and dry release tests. The film breaks at about 2000 g/1.27 cm during the peel test in the latter case. Therefore at zero coat weight the peel strength is equal to 2000 g/1.27 cm. FIG. 1 compares the performance of hydroxypropyl methylcellulose (i.e. Methocel® K35LV coated Dartek® T404 produced in run nos. 8, 10, 12, 14, 16 in Table 5) with the release test results of TM®-8836 coated Dartek® T404 from Comparative Examples 1 to 3. All points below the horizontal line at 200 g/1.27 cm in FIG. 1 satisfy the release criteria.

The dry release test results shown as open symbols in FIG. 1 clearly show that the coat weight required for adequate release in case of Methocel® K35LV is half of what is needed with TM®-8836.

According to FIG, 1, Methocel® K35LV coated Dartek® T404 provides adequate release (less than 200 g/1.27 cm) at coating weights as low as 0.15 lb/ream in a wet release test. The latter coat weight includes two sided coated Dartek® T404 film. Since release is checked from Viton® rubber on each side of the coated film, it can be said in a more general sense that 0.075 lb/ream of Methocel® K35LV on a polyamide 66 film surface gives peel strengths well within the acceptable criteria (below 200 g/1.27 cm) in a wet release test. It is impractical to control coating weights of less than 0.075 lb/ream per side with the existing coating technology and difficult to measure them. The coat weight is traditionally measured by washing away the coating on a square sample of the coated film to obtain the change in weight. This change in weight is then multiplied by an appropriate factor assuming uniform coating to give the coat weight in lb/ream.

The wet release data for Methocel® K35LV shown in FIG. 1 is modeled using a 3 parameter exponential decay equation of the following form:

$$y = y_0 + a \cdot e^{-bx} \quad (1)$$

where, y is the peel strength in g/1.27 cm and x is the two sided coat weight in lb/ream.

A good fit to the wet release test data of Methocel® K35LV coated Dartek® T404 film is obtained using Equation (1), with $y_0$ equal to 22.65 g/1.27 cm (g/1.27 cm); and a and b equal to 1977 g/1.27 cm (g/1.27 cm) and 290 ream/lb(0.61 m²/gm.) respectively. According to Equation (1), the two sided coat weights required for acceptable release, i.e. 200 g/1.27 cm, in a wet release test is equal to 0.008 lb/ream. This means that only 0.004 lb/ream of Methocel® K35LV is required per side for adequate release in a wet release test. Based on the above interpolation using Equation (1), a minimum of 0.004 lb/ream of hydroxypropyl methylcellulose containing molar hydroxypropyl substitution of 0.21, coated on a polyamide66 film provides release in high temperature and high humidity conditions. According to Equation (1), the minimum 2 side coat weight depends on the release criteria e.g. release criteria of 800 g/1.27 cm would require 0.003 lb/ream of Methocel® K35LV.

Different grades of hydroxypropyl methylcellulose can be obtained by changing the molar hydroxypropylyl substitution as mentioned in Table 1. FIG. 2 shows the constant peel strength contours for different grades of hydroxypropyl methylcellulose at varying coat weights results shown on Table 6 and 7) in wet and dry release tests. It can be seen that all grades of hydroxypropyl methylcellulose give adequate release in both wet and dry release tests at a minimum coat weight of 0.15–0.5 lb/ream coated equally on both sides of the polymer film or 0.075–0.25 lb/ream per side. The preferred grades of hydroxypropyl methylcellulose for the release coating on polymer film are those containing 0–0.60 molar hydroxypropyl substitution.

TABLE 6

DRY RELEASE TEST RESULTS WITH VITON ® RUBBER

| Ex. No. | AV. PEEL ST., G/1.27 CM | σ |
|---|---|---|
| 4 | 56.3 | 18.2 |
| 5 | 40.5 | 7.4 |
| 6 | 64.3 | 30.4 |
| 7 | 137.7 | 45.7 |
| 8 | 254.1 | 20.3 |
| 9 | 76.5 | 68.7 |
| 10 | 42.6 | 7.1 |
| 11 | 113.40 | 92.96 |

TABLE 7

WET RELEASE TEST RESULTS WITH VITON ® RUBBER

| Ex. No. | Av. Peel st., g/1.27 cm | σ | Observations |
|---|---|---|---|
| 5 | 36.50 | 16.50 | No fibrillation, significant transfer (gummy), clear |
| 6 | 18.00 | 8.00 | No fibrillation at all, significant transfer (gummy), clear |
| 7 | 26.33 | 7.11 | Slight fibrillation, no transfer, clear |
| 8 | 9.75 | 2.63 | Insignificant transfer, lesser fibrillation |
| 9 | 18.75 | 8.69 | No fibrillation, no transfer |
| 10 | 45.78 | 12.15 | Slight transfer, no fibrillation |
| 11 | 87.56 | 59.06 | No fibrillation, very gummy |

Haze Test

After a wet release test, the haze of all the films tested for wet release in Table 7 was measured as per ASTMD1003. To generate a control sample, an uncoated Dartek® T404 sample was kept at 160° C., 80 psi steam for 35mins in an autoclave without any contact with the rubber compound. The latter uncoated sample was also subjected to haze test as per ASTMD1003. The result of the haze test are mentioned in Table 8. FIG. 3 shows contours of constant % haze for Dartek® T404 film coated with different grades of hydroxypropyl methylcellulose on both sides at variable coat weights. As listed in Table 8, the haze of Dartek® T404 is 1.6%. It can be clearly seen in FIG. 3, that the hydroxypropyl methylcellulose grade having 0.12–0.32 molar hydroxypropyl substitution has lower haze than uncoated Darteke® T404 film.

TABLE 8

HAZE TEST RESULTS AFTER A WET RELEASE TEST WITH VITON ® RUBBER

| Ex. No. | Haze, % |
|---|---|
| DARTEK ® T404 (control) | 1.60 |
| 5 | 1.40 |
| 6 | 1.70 |
| 7 | 1.10 |
| 8 | 1.90 |
| 9 | 1.60 |
| 10 | 2.30 |
| 11 | 2.40 |

Grave's Tear Test

The hydroxypropyl methylcellulose coated Dartek® T404 films listed in Table 7 were also tested for unnotched tear strength after they were subject to wet release testing. The idea was to investigate the effect of hydroxypropyl methylcellulose on the force required to initiate tear of polyamide66 film after the films were exposed to hot and humid conditions. The Grave's test was performed as per ASTMD1004-94a. The results of Grave's tear test are mentioned below in Table 9.

TABLE 9

GRAVE'S UNNOTCHED TEAR TEST RESULTS AFTER EXPOSING THE SAMPLES TO 160° C., 80 PSI FOR 35 MINS.

| | Grave's tear results (MD) | | Grave's tear results (TD) | |
|---|---|---|---|---|
| Ex. No. | Load/thck@auto brk, lbf/in | σ | Load/thck@auto brk, lbf/in | σ |
| DARTEK T404NA | 212.76 | 59.24 | 718.82 | 50.52 |
| 5 | 260.40 | 152.72 | 742.89 | 68.57 |
| 6 | 253.39 | 64.90 | 625.27 | 114.00 |
| 7 | 254.97 | 128.75 | 731.15 | 131.64 |
| 8 | 943.24 | 44.33 | 673.15 | 140.01 |
| 9 | 263.08 | 115.23 | 744.22 | 132.30 |
| 10 | 914.86 | 81.56 | 932.25 | 118.49 |
| 11 | 808.23 | 717.73 | 885.89 | 220.89 |

The force required to initiate un-notched tear per unit thickness on Methocel® K35LV coated Dartek® T404 samples as a function of coat weight is shown in FIG. 7. It can be seen that as little as 0.18 lb/ream of Methocel® K35LV per two sides, increases the tear strength/thickness of the release film by approx. 22% in the machine direction. However, no such benefit is seen in the transverse direction. FIG. 7 suggests that the tear strength per thickness is independent of Methocel® K35LV coating in transverse direction for the coat weights investigated. Similar results were obtained for all other grades of hydroxypropyl methylcellulose (molar hydroxypropyl substitution from 0–0.82) coated Dartek® T404.

Wettability Of Dartek® T404

The tension of TM®-8836 is 25.88–35.02 dyn/cm as mentioned in the product literature supplied by Release Coatings Inc. of New York. But the surface tension of the Dartek® T404 film coated with the latter is 48.54 dyn/cm as determined by contact angle measurements and approximated by harmonic mean method as per ASTMD5946-99. The surface tension of Dartek® T404 is in-between 45–50 dyn/cm. This suggests that TM®-8836 does not wet out the Dartek® T404 film completely. The latter suggestion was confirmed by looking at the surface of TM®-8836 coated Dartek® T404 film under the microscope. Green colored aggregates of TM®-8836 were observed on the surface. On the other hand nothing was seen on the hydroxypropyl methylcellulose coated Dartek® T404. But a drop of water on the latter emitted blue color as observed under the microscope. Later on it was observed that hydroxypropyl methylcellulose molecules even in the absence of polyamide66 molecules emitted blue color when wetted with water. This suggest that hydroxypropyl methylcellulose forms a continuous layer on polyamide66 film.

The following examples were aimed at evaluating the effect of adding silica to hydroxypropyl methylcellulose solution in water on processability and release from cured rubber in dry and wet release tests. A high film-forming grade of hydroxypropyl methyl cellulose containing 0.23 hydroxypropyl molar substitution was supplied by Dow Chemical Company under the commercial name of Methocel® E15LV. Silica was obtained in colloidal form for ease of mixing. The colloidal silica used for these examples was supplied by E.I. Du Pont de Nemours and Company, under the commercial name of Ludox® CL-P. Ludox® CL-P is a positively charged sol made by coating negative silica particles with a positive layer of alumina. The size of the latter particles is around 22 nm with a specific surface area of 140 m$^2$/g. Ludox® CL-P contains 40 wt % silica and has a pH in-between 3.5–4.5. In order to illustrate the effect of Ludox® CL-P content in the coating composition on processability and release characteristics, five different coatings were prepared. The compositions of these five coatings are summarized in Table 10 and their preparation method is discussed below.

TABLE 10

COMPOSITIONS FOR COATINGS.

| | Weight % | | | |
|---|---|---|---|---|
| Example No. | Methocel ® E15LV | Ludox ® CL-P | Isopropanol | Water |
| 12 | 3 | 1 | 13 | 83 |
| 13 | 2.44 | 0.81 | 10.57 | 86.18 |
| 14 | 1.87 | 0.62 | 8.1 | 89.40 |
| 15 | 1.06 | 1.18 | 4.6 | 93.14 |
| 16 | 0.48 | 0.54 | 2.09 | 96.89 |

Example 12

0.3 kg Methocel® E15LV was added to 1.3 kg isopropanol while continuously stirring the solution to form slurry. 8.3 kg cold tap water was added and followed by 0.1 kg Ludox® CL-P to the latter slurry to obtain 10 kg of coating solution. The solution was continuously agitated for about 30 minutes to form a clear viscous solution.

Example 13

1.65 kg cold tap water was added to 7.175 kg of the coating solution of Example 12. The mixture was gently stirred for 20 minutes.

Example 14

2.1 kg cold tap water was added to 6.885 kg of the coating solution of Example 13. The mixture was gently stirred for 20 minutes.

Example 15

5.6 cold tap water was added to 7.535 kg of the coating solution of Example 14, followed by 0.11 kg Ludox® CL-P. The mixture was gently stirred for 20 minutes.

Example 16

4.8 kg cold tap water was added to 4 kg of the coating solution of Example 15. The mixture was gently stirred for 20 minutes.

The above prepared coatings of Examples 12 through 16 were coated on Dartek® T404 using 165 quad cylinder on a direct gravure coater from Faustel Inc. The values of coating parameters corresponding to each run are mentioned in Table 11.

TABLE 11

COATINGS ON DARTEK ®T404 ON FAUSTEL

| RUN NO. | SUBSTRATE | EX. NO. | TOTAL SOLIDS % | LINE SPEED FPM | OVEN TEMP° C. | COAT WEIGHT LB/REAM/2SIDES |
|---|---|---|---|---|---|---|
| 23 | 25μ Dartek ®T404 first side | 12 | 3.4 | 150 | 101 | — |
| 24 | 25μ Dartek ®T404 second side | 12 | 3.4 | 150 | 101 | 0.75 |
| 25 | 25μ Dartek ®T404 first side | 13 | 2.75 | 150 | 100 | — |
| 26 | 25μ Dartek ®T404 second side | 13 | 2.75 | 150 | 100 | 0.51 |
| 27 | 25μ Dartek ®T404 first side | 14 | 2.1 | 200 | 100 | — |
| 28 | 25μ Dartek ®T404 second side | 14 | 2.1 | 200 | 100 | 0.33 |
| 29 | 25μ Dartek ®T404 first side | 15 | 1.53 | 200 | 100 | — |
| 30 | 25μ Dartek ®T404 second side | 15 | 1.53 | 200 | 100 | 0.31 |
| 31 | 25μ Dartek ®T404 first side | 16 | 0.7 | 200 | 100 | — |
| 32 | 25μ Dartek ®T404 second side | 16 | 0.7 | 200 | 90 | 0.24 |

It was observed that small amounts of Ludox® CL-P in aqueous Methocel® E15LV solution resulted in higher transfer of coating at higher percent solids in the solution. FIG. 4 shows the increase in coat weight with increase in percent solids in the solution for various coatings investigated in Examples 1 to 16. The coat weight corresponding to the coatings containing TM®-8836, Methocel® K35LV and Methocel® E15LV level off or dorp at approximately 3% solids. This is expected as the viscosity of the solution increases with increasing % solids, which makes it increasingly difficult for the cylinders to transfer the coating onto the film. On the other hand a solution containing Methocel® E15LV/Ludox® CL-P ratio equal to 3/1, where Methocel® E15LV accounts for 1.86% to 3% of the solution, gives surprisingly higher transfer of the coating to Dartek® T404 above 3% solids. Ludox® CL-P is an aqueous colloidal dispersion of very small silica particles. The silica used in Ludox® CL-P is made up of negative silica particles with a positive layer of alumina. It is speculated that the positive charge imparted to the coatings of Examples 12 through 16, because of Ludox® CL-P helps the transfer of the release coating on to the Dartek® T404 film which has amide negative ions on the surface. This property is in addition to the usual behaviour of silica and other particulate solids which act as processing aids for the film to be coated.

Release Testing

The results of wet and dry release tests performed on Dartek® T404 film samples coated with a blend of hydroxypropyl methylcellulose and Ludox® CL-P corresponding to Run Nos. 24, 26, 28, 30, 32 in Table 11 with uncured Viton® rubber compound, are mentioned in Table 12. In addition to the coated films mentioned in Table 12, a sample of Dartek® T404 film hand-wiped with Ludox® CL-P, so as to achieve a coat weight of 0.8 lb/ream per two sides was also subjected to dry release testing with uncured Viton® rubber compound. The latter sample stuck to the cured rubber. FIG. 5 shows the effect of increasing the weight fraction of silica in the dried coating on a two side coated Dartek® T404 film. It can be clearly seen that for a particular coat weight of a two side coated Dartek® T404 film, 0.01–0.60 weight fraction of silica in the dried coating reduces the peel strength. The minimum in peel strength is found around 0.15 silica wt fraction. However, excess amount of silica (above 0.60) on the surface increases the peel strength with complete adhesion (peel strength of 2000 g/1.27 cm) at 100% silica in the dried coating.

TABLE 12

Dry and Wet release test results of release films prepared with Viton ® rubber.
The dash line means that results are not available.

| | Dry release test result | | Wet release test result | |
|---|---|---|---|---|
| Ex. No. | Av. Peel st., g/1.27 cm | σ | Av. Peel st., g/1.27 cm | σ |
| 12 | 32.8 | 5.1 | 36.33 | 12.67 |
| 13 | 64.7 | 45.2 | — | — |
| 14 | 52.2 | 23.1 | — | — |
| 15 | 62.3 | 31.7 | — | — |
| 16 | 138.4 | 24.2 | 51.25 | 28.4 |

The following Examples 17 through 18, show that the mixture of hydroxypropyl methylcellulose and silica, when coated onto the surface of various polymer films impart high temperature and high humidity release characteristics to the film. In this example, three different films, which have a melting point above 160° C. (temperature of wet and dry release test) were coated with a mixture of hydroxypropyl methylcellulose and silica. The films used, included 25 microns thick biaxially oriented polyester supplied by E. I. DuPont de Nemours under the trade name of Mylar®, 100 microns thick heat stabilized cast Nylon66 film supplied by Enhance Packaging Technologies Inc. under the trade name of Dartek® C917 and 25 microns thick biaxially oriented Nylon6 film supplied by Pt. Kolon Ina, Indonesia under the trade name of Amidroll®. Once coated, the latter films were subject to wet and dry release testing. The hydroxypropyl methylcellulose was supplied by Dow Chemical Company under the trade name Methocel®. The colloidal silica used in the coating formulation was supplied by W R Grace under the trade name of Ludox® CL-P (formerly owned by E. I. du Pont de Nemours and Company).

TABLE 13

Compositions for coatings.

| | Weight % | | | |
|---|---|---|---|---|
| Example No. | Methocel ® K35LV | Ludox ® CL-P | Isopropanol | Water |
| 17 | 2.67 | 0 | 17.33 | 80.0 |
| 18 | 3.35 | 1.12 | 21.80 | 73.73 |

Example 17

0.267 kg Methocel® K35LV was added to 1.733 kg isopropanol while continuously stirring the solution to form a slurry. 8.0 kg cold tap water was added to the latter slurry and the resulting solution was subject to high shear agitation for 30–40 minutes to form a clear brownish viscous solution. Thus 10 kg coating solution was prepared.

Example 18

0.335 kg Methocel® K35LV was added to 2.18 kg isopropanol while continuously stirring the solution to form a slurry. 7.373 kg cold tap water was added to the latter slurry and the resulting solution was subject to high shear agitation for 30–40 minutes to form a clear brownish viscous solution. Finally 0.112 kg Ludox® CL-P was added to the solution and the agitation was continued for another 20–30 minutes. Thus 10 kg coating solution was prepared.

The above prepared coatings of Examples 17 through 18 were coated on various polymer films using 165 quad cylinder on a direct gravure coater from faustel Inc. The values of coating parameters corresponding to each run are mentioned in Table 14.

TABLE 14

Coatings on various polymer films on Faustel

| Run No. | Substrate | Ex. No. | Total solids % | Line speed fpm | Oven temp ° C. | Coat weight lb/ream/2 sides | % SILICA IN DRIED COATING |
|---|---|---|---|---|---|---|---|
| 33 | 25μ Mylar ® first side | 17 | 2.67 | 200 | 90 | | 0 |
| 34 | 25μ Mylar ® second side | 17 | 2.67 | 200 | 90 | 0.16 | 0 |
| 35 | 100μ Dartek ®C917 first side | 18 | 3.8 | 200 | 60 | — | |
| 36 | 100μ Dartek ®C917 second side | 18 | 3.8 | 200 | | 0.31 | 12 |
| 37 | 25μ Amidroll ® first side | 18 | 3.8 | 200 | 55 | | |
| 38 | 25μ Amidroll ® second side | 18 | 3.8 | 200 | 55 | 0.27 | 12 |

The results of wet and dry release tests performed on various polymer films coated with a blend of hydroxypropyl methylcellulose and Ludox® CL-P corresponding to run nos. 34, 36, 38 in Table 14 with uncured Viton® rubber compound is mentioned in Table 15. The value of peel strength for uncoated samples of the films coated in Table 14 are also mentioned in Table 15.

TABLE 15

Dry and Wet release test results of release films prepared in Table 14 With Viton ® rubber. The dash line means that results are not available.

| Run. Nos. | Film Substrate. | Coating From Example No. | Dry release test result Av. Peel st., g/1.27 cm | σ | Wet release test result Av. Peel st., g/1.27 cm | σ |
|---|---|---|---|---|---|---|
| — | 25μ Mylar ® | None | Stuck | — | stuck | — |
| 34 | 25μ Mylar ® | 17 | 189 | 63 | 10 | 5 |
| — | 100μ Dartek ®C9 17 | None | stuck | — | Stuck | — |
| 36 | 100μ Dartek ®C9 17 | 18 | 32.25 | 6.06 | 74 | 30 |
| — | 25μ Amidroll ® | None | Stuck | — | film melts and is no longer there | — |
| 38 | 25μ Amidroll ® | 18 | 6.4 | 1.68 | film melts and is no longer there | — |

The following Example 19 is to establish the maximum limit of the amount of hydroxypropyl methylcellulose in the coating solution. Trace amount of silica is also added to the latter solution for ease of processability in the coater. The latter solution can be used with a suitable cylinder to obtain the desired coat weight on the polymer films. The low viscosity grade of hydroxypropyl methylcellulose was supplied by Dow Chemical Co. under the trade name of Methocel® K3 premium LV.

TABLE 16

Composition for coating

Weight %

| Example No. | Methocel ® K3 premium LV | Ludox ® CL-P | Isopropanol | Water |
|---|---|---|---|---|
| 19 | 15.0 | 5.1 | 30 | 49.9 |

The formulation for the coating solution is mentioned in Table 16. In order to prepare 7 kg of coating solution, 1.05 kg Methocel® K3 premium LV was slowly added to 2.1 kg of isopropanol while continuously agitating the mixture. The mixture was agitated for 30 minutes to make sure that Methocel® K3 premium LV powder was fully dispersed in isopropanol and no lumps were formed. Subsequently, 3.49 kg cold tap water (5° C.–25° C.) was added while stepping up the agitation. The resulting mixture was agitated at high speed for 1–2 hours till a clear brownish viscous solution was formed. Finally, 357 g of Ludox® CL-P was added and the solution was agitated for another 30 minutes. The coating solution had 17% solids content.

The thus prepared solution was coated onto 25 microns thick monoaxially oriented Nylon66 film supplied by Enhance Packaging Technologies Inc. under the trade name of Dartek® T404. The coating run was conducted on the direct gravure coater from Faustel at 200 ft/min using a 180 quad cylinder. The exit film temperature was 88° C. and the coat weight achieved after coating the film in two separate passes was about 0.84 lb/ream per both sides. The coated film was subject to dry and wet release test with Viton® rubber compound. A force of 12±7 g/1.27 cm was required to strip off the coated film from cured Viton® rubber in a dry release test and a force of 10±5 g/1.27 cm was required in a wet release test.

The following Example 20 is to illustrate that a mixture of hydroxypropyl methylcellulose having different levels of hydroxypropyl molar substitutions in the coating solution when coated onto a polymer film gives adequate release performance both in dry and wet release tests. A trace amount of silica is also added to the latter solution for ease of processability in the coater. The various grades of hydroxypropyl methylcellulose having different levels of hydroxypropyl substitution were supplied by Dow Chemical Co. under the trade name of Methocel® (see Table 1).

Example 20

TABLE 17

Composition for coating

Weight %

| Example No. | Methocel ® K35 LV | Methocel ® E15 premium LV | Methocel ® A15 LV | Ludox ® CL-P | Water |
|---|---|---|---|---|---|
| 20 | 0.91 | 2.37 | 1.13 | 1.49 | 94.1 |

The formulation for the coating solution is mentioned in Table 17. In order to prepare 15 kg of coating solution, 136.5 g of Methocel® K35LV, 355.5 g of Methocel® E15 premium LV and 169.5 g of Methocel® A15LV were collected in a container. The latter mixture (661.5 g in total) of various grades of Methocel® powder was added to 14.12 kg of cold tap water while continuously agitating the mixture at high speed. The mixture was agitated for 1–2 hours to make sure that a clear viscous solution was obtained. 223.5 g of Ludox® CL-P was added and the solution was agitated for another 30 minutes. The coating solution had 5% solids content.

The thus prepared solution was coated onto 25 microns thick monoaxially oriented Nylon66 film supplied by Enhance Packaging Technologies Inc. under the trade name of Dartek® T404. The coating run was conducted on the direct gravure coater from Faustel at 250 ft/min using a 180 quad cylinder. The exit film temperature was 70° C. and the coat weight achieved after coating the film in two separate passes was about 0.54 lb/ream per both sides. The coated film was subject to dry and wet release test with Viton® rubber compound. A peel strength of 8.83±4.11 g/1.27 cm was required to strip off the coated film from cured Viton® rubber in a dry release test and a force of 13.2±11.4 g/1.27 cm was required in a wet release test.

The following Example 21 shows the effect of coating various films with hydroxypropyl methylcellulose containing solutions on their release performance in a dry curing release test with carbon fiber reinforced expoxy resin. The 292μ thick carbon fiber reinforced epoxy sheets used in this example, were supplied by Fujikura Composite America, Inc, California. The latter composite sheet is used by Fujikura Composites for making golf shafts.

Example 21

The five films selected for the dry release test with carbon fiber reinforced epoxy resin are:

SAMPLE 1. Uncoated, monoaxially oriented 25μ thick Nylon66 film obtained from Enhance Packaging Technologies under the trade name of Dartek® T404.

SAMPLE 2. Uncoated biaxially oriented, 25μ thick Nylon6 film obtained from Pt. Kolon Ina, Indonesia under the trade name of Amidroll®.

SAMPLE 3. Dartek® T404 coated in Run 15 and 16 with Methocel® K35LV containing solution prepared in Example 8.

SAMPLE 4. Amidroll® coated in Run 37 and 38 with a mixture of Methocel® K35LV and Ludox® CL-P containing solution prepared in Example 18.

SAMPLE 5. Dartek® T404 coated in Example 19 with a mixture of Methocel® K3LV and Ludox® CL-P containing solution.

Description of the Dry Release Test with Fiber Reinforced Plastic

In a dry release test for Fiber Reinforced Plastic, an uncured composite sheet comprising of a mixture of fiber and resin in a sheet form on a paper or polymer film carrier is used. Approximately 1.2 g (6 cm×6 cm square sample) of the latter composite sheet is pressed in between two release sheets at 5000 pounds (2.27 tons) in a 9 inch×9 inch (22.86 cm ×22.86 cm) press and 325° F. (163° C.) for 1.5 hr. Subsequently, the sample is cooled to room temperature and a strip (4"×½") of the release sheet/cured composite sheet/release sheet sandwich is cut and subjected to a 180 degree peel test at a crosshead speed of 10"/min using a peel tester. The peel test is conducted as per the Pressure Sensitive Tape Council's appendix B and ASTMD1876. The dry release test is designed on the assumption that humidity has no effect on peel strength. The peel test is conducted in-between the film and the face of the composite sheet comprising of cured resin and fibers.

Samples 1 through 5 were subject to dry release test for composites. The results are as follows:

TABLE 18

Dry release test results of release films With Carbon Fiber Reinforced Epoxy Composite Sheets
The dash line means that results are not available.

| Sample. No. | Dry release test result | |
|---|---|---|
| | Av. Peel st., g/1.27 cm | σ |
| 1 | 282 | 115 |
| 2 | stuck like glue | — |
| 3 | 5 | 2 |

TABLE 18-continued

Dry release test results of release films With Carbon Fiber Reinforced Epoxy Composite Sheets
The dash line means that results are not available.

| Sample. No. | Dry release test result | |
|---|---|---|
| | Av. Peel st., g/1.27 cm | σ |
| 4 | 5 | 2 |
| 5 | 7 | 2 |

It can be clearly seen in the release test results mentioned in Table 18, that coating Nylon66 or Nylon6 films with hydroxypropyl methylcellulose or a mixture of hydroxypropyl methylcelllose and silica enhances its release from the cured epoxy composite sheet.

The following example is to establish the maximum limit of hydroxypropyl methylcellulose concentration in water which can be diluted further with water and (or) any organic solvent like isopropyl alcohol.

Example 22

TABLE 19

| Formulation: | I | II |
|---|---|---|
| Methocel K3LV, % | 40.06 | 5.79 |
| IPA, % | 0.00 | 11.11 |
| Water, % | 59.94 | 83.10 |
| Total solids, % | 40.10 | 5.79 |

A dense solution of hydroxypropyl methylcellulose in water was made as per Formulation I in Table 19. In order to make 6.34 kg of latter solution, 3.8 kg hot water (90–100° C.) was added to 2.54 kg Methocel® K3 Premium LV and subsequently the mixture was subjected to high shear for approximately 2 hrs. The dense solution was left at room temperature for 24 hrs to cool down. The advantage of this dense solution is that it can be readily diluted with solvents to whatever % solids are required by the employed coating process. Making concentrated solution of hydroxypropyl methylcellulose in water makes the storage and transportation of the coating more cost effective.

For a direct gravure coating application with a 180 quad cylinder, the above prepared, dense solution was diluted to Formulation II shown in Table 19. The dilution was performed by adding 2 kg isopropyl alcohol to 2.6 kg of slurry prepared as per Formulation IV under high shear agitation. After agitating for approximately 30 minutes 13.4 kg of cold tap water was added. The solution was agitated until a clear brownish viscous solution was obtained. In this way 18 kg of coating solution as per Formulation II in Table 19 was obtained.

The thus prepared solution was coated onto 25 microns thick monoaxially oriented Nylon66 film supplied by Enhance Packaging Technologies Inc. under the trade name of Dartek® T404. The coating run was conducted on the direct gravure coater from Faustel at 250 ft/min using a 180 quad cylinder. The exit film temperature was 45° C. and the coat weight achieved after coating the film in two separate passes was about 0.54 lb/ream per both sides. The coated film was subject to dry release test with Viton® rubber compound. A peel strength of 13.25±0.88 g/1.27 cm was required to strip off the coated film from cured Viton® rubber in a dry release test.

Hydroxypropyl methylcellulose with different levels of hydroxypropyl molar substituion can be coated onto the polymer film using a variety of coating processes. These coating processes depend on a number of parameters including rheological and surface properties of the coating solution. More information on these parameters can be found in Edgar B. Gutoff, Edward D. Cohen, "Coating and Drying Defects-Troubleshooting Operating Problems", John Wiley & Sons Inc., NY (1995).

In general rotogravure coating can handle coating solutions having viscosity of up to approximately 1000 cps with proper selection of the coating cylinder. More viscous coatings can be handled in other coating processes like extrusion coating and slot die coating. The viscosity of coating solution increases with increasing content of Hydroxypropyl methylcellulose in the solution (See Dow Chemical Company, "Methocel Cellulose Ethers Technical Handbook" published June 1997).

Although hydroxypropyl methylcellulose is infinitely soluble in cold water, the practical limit for incorporation of hydroxypropyl methylcellulose in water is about 40%. Increasing the hydroxypropyl methylcellulose content in the solution above 40% gives rise to problems, such as incomplete wetting.

Usually the coating solution is made at higher percent solids in order to eliminate handling and storage problems. Depending on the mixing facilities available 15–40% of hydroxypropyl methylcellulose is mixed with water or a mixture of organic solvents and water. Trace quantity of colloidal silica may also be mixed into the latter solution for ease of processability. Some typical formulations can be found in Examples 1–22. This concentrated solution is then diluted so that the viscosity and percent solids in the coating are suitable for the coating process employed. Depending on the level of hydroxypropyl molar substituion in the Hydroxypropyl methylcellulose used in the concentrated solution, it can be diluted to 0.2%–17% solids.

The following example is to show the best mode for making a release film by coating Dartek® T404 (supplied by Enhance Packaging Technologies, Whitby) with a mixture of Methocel® K3LV premium from Dow Chemical Co., and Ludox®CI-P from W R Grace & Co. A 60 inch wide two roll coater equipped with a turning bar was used to coat Dartek® T404 on both sides in a single pass.

Example 23

First a coating mixture concentrate containing 17% solids was prepared. The ingredients of the coating mixture concentrate along with their weight percent compositions and sequence of addition are set out in Table 20.

A stepwise description for preparing one 300 kg batch of a concentrate of coating solution.

TABLE 20

The components with their respective weight percent in the blended solution.

| Sequence. No. | Ingredient | % wt. in coating solution | Weight in kg for making 300 kg solution |
|---|---|---|---|
| 1 | Isopropyl alcohol | 30.0 | 90.0 |
| 2 | Methocel ® K3LV premium grade | 15.0 | 45.0 |
| 3 | Cold tap Water | 49.9 | 149.7 |
| 4 | Ludox ® Cl-P | 5.1 | 15.3 |
| | Total | 17.0% solids | 300 | follows:

Requirements: A high shear mixer, a mixing tank capable of storing 350 kg of water, Supply of clean cold tap water at 5° C.–25° C., calibrated weighing scale measuring up to at least 1 decimal places, two 45 gallon plastic drums; and the mixture should be prepared at room temperature.

1. 90.0 kg of isopropyl alcohol was poured into the empty mixing tank.
2. 45 kg Methocel® K3LV premium grade powder was slowly added to the mixing tank and the mixture was subjected to high shear in order to prepare a slurry.
3. The mixture was agitated until the particles of Methocel® K3LV premium grade were evenly dispersed (up to 10–15 minutes). Care was taken to ensure that no Methocel® K3LV premium grade lumps were formed.
4. The Methocel® K3LV premium grade slurry was agitated in isopropyl alcohol while 149.7 kg of cold tap water was slowly added to the slurry.
5. The mixture was agitated until a clear viscous solution with no lumps was obtained. The agitation was continued for at least 30 minutes.
6. 15.3 kg Ludox® CI-P was added to the mixture while continuously agitating the mixture.

The 300 kg of blended solution prepared above were stored in 2 plastic 45 gallon drums. The lid of the container was tightly closed. The filled drums were stored at room temperature. The viscosity of the blended solution as measured by Brookfield viscometer was approximately 750 cp at 25° C. This concentrate of coating solution (17% solids) was diluted to managable solids content (4.5% solids) for the coating.

A stepwise description of preparing a 150 kg batch of coating solution containing 4.5% solids follows:

Requirements: 1 clean 45 gallon drum, a clean agitator, supply of clean cold tap water at 5° C.–25° C., calibrated weighing scale measuring up to at least 1 kg; and the mixture should be prepared at room temperature 1. 40.0 kg of 17% solids coating solution concentrate was placed in a clean 45 gallon drum.
2. The solution was agitated in the drum while adding 95 kg cold tap water followed by 15.0 kg isopropanol.
3. The resulting 150 kg solution was agitated mildly for at least 15 minutes before it was used.
4. One batch (150 kg) of the coating solution (4.5% solids) coats approximately 305 kg of 25 microns thick Dartek® T404 (60 inches wide) at a coat weight of 0.4 lb./ream per both sides.

If the above-prepared solution is used at a later date then the lid of the container containing the coating solution is tightly closed and the container is stored at room temperature.

Coating Run

The film was coated on both sides in a single pass using the turning bar. The coating solution was agitated for at least 15 minutes prior to use.

Tension requirements were worked out by considering that the optimum tension required for coating 25 micron thick Dartek® T404 is about 703.5 psi (38 lbs for 54 inches wide 1 mil thick Dartek® T404), which corresponds to a strain of about 0.48% in the oven.

The exit temperature of the film was at least 60° C.

The coating conditions for each pass were as follows:

| Line speed, ft/min: | 575 (175 m/min) |
|---|---|
| EDT Prim.: | 3 KW |

| | |
|---|---|
| Coated Film Temperature: | minimum = 60° C., maximum = 70° C. |
| Dry bond rolls: | off |
| Chill roll: | As required to achieve room temperature wind |
| Coat weight: | 0.20 ± 0.05 lb./ream per side |

The coat weight of the film was measured every mill roll. The coat weight was determined as per the procedure mentioned in Document #W-3020-641-02.

The coated film was subject to dry and wet release test with Viton® rubber compound. A force of 40±15 g/1.27 cm was required to strip off the coated film from cured Viton® rubber in a dry release test and a force of 25±10 g/1.27 cm was required in a wet release test.

Brief Description of Test Methods Used in Examples

ASTMD1004-94a: This is a standard test method for initial tear-resistance of plastic film and sheeting. The test covers the determination of tear resistance of flexible plastic film and sheeting at very low rates (2 inches/min). The method is designed to measure the force to initiate tearing. The specimen geometry of this test method produces a stress concentration in a small area of the specimen. The maximum stress, usually found near the outset of tearing is recommended as the tear resistance.

ASTMD1003: This is a standard test method for haze and luminous transmittance of transparent plastics. The test covers the evaluation of specific light-transmitting and wide-angle-light-scattering properties of planar sections of materials, such as essentially transparent plastic. A hazemeter was used as mentioned in the earlier description of the haze test.

ASTMD1876: This is a standard test method for peel resistance of adhesives (T-peel test). This test is primarily intended for determining the relative peel resistance of adhesive bonds between flexible adherents.

ASTMD5946-99: This is a standard test method for corona treated polymer films using water contact angle measurements. The test covers measurement of the contact angle of water droplets on corona treated polymer film surface with subsequent estimation of the film's wetting tension.

Document #W-3020-641-02 from Morton International, Inc dated Jun. 15, 1994 describes the technique used for determining the coating weight (lbs/ream) for adhesives and coatings. This method may be used for determining coating weights for hand lamination evaluation or for determining coatings weights from previously laminated samples.

The invention may be varied in any number of ways as would be apparent to a person skilled in the art and all obvious equivalents and the like are meant to fall within the scope of this description and claims. The description is meant to serve as a guide to interpret the claims and not to limit them unnecessarily.

What is claimed is:

1. A release coating composition for polymer films, which films are for use in high temperature and/or high humidity applications, which composition comprises an aqueous solution of from about 0.2 to about 6.0% by weight of at least one hydroxypropyl methylcellulose having hydroxypropyl molar substitution of from 0 to about 0.82 and from about 1% to about 35% by weight of alcohol.

2. A release coating composition as claimed in claim 1, wherein the solution comprises a low viscosity hydroxypropyl methylcellulose having hydroxypropyl molar substitution of from 0 to about 0.82 in water, wherein low viscosity means the viscosity of a 2% by weight of a solution of hydroxypropyl methylcellulose in water at room temperature (20° C.) is up to 100 centipoise.

3. A release coating composition as claimed in claim 2, wherein the solution also comprises up to about 3% by weight of high viscosity hydroxypropyl methylcellulose having hydroxypropyl molar substitution of from 0 to about 0.82 in water, wherein high viscosity means the viscosity of a 2% by weight of a solution of hydroxypropyl methylcellulose in water at room temperature (20° C.) is from 100 to 100,000 centipoise.

4. A release coating composition as claimed in claim 1, wherein the solution comprises a mixture of non-aqueous solvent and water and the ratio of parts of solvent to hydroxypropyl methylcellulose ranges from about 2 to about 8:1.

5. A release coating composition as claimed in claim 1, wherein a particulate solid is additionally present in the solution.

6. A release coating composition as claimed in claim 5, wherein the particulate solid is silica.

7. A release coating composition as claimed in claim 5, wherein the particulate solid is talc.

8. A release coating composition as claimed in claim 5, wherein the ratio of particulate solid to hydroxypropyl methylcellulose is in the range of from about 0.01 to about 1.5.

9. A release coating composition as claimed in claim 1, wherein the polymer film is selected from the group comprising polyolefins, polyesters, nylons and combinations thereof.

10. A release coating composition as claimed in claim 9, wherein the nylons are selected from Nylon 66 and Nylon 6 films.

11. A release coating composition as claimed in claim 9, wherein the polymer film is monoaxially or biaxially oriented.

* * * * *